US005207112A

United States Patent [19]

Sweetland et al.

[11] Patent Number: 5,207,112

[45] Date of Patent: May 4, 1993

[54] DUCTILE IRON GEAR AND CASTING PROCESS FOR THE PRODUCTION THEREOF

[75] Inventors: Roger D. Sweetland; Kevin R. Beutler, both of Columbus, Ind.

[73] Assignee: Cummins Engine Company, Inc., Columbus, Ind.

[21] Appl. No.: 843,278

[22] Filed: Feb. 28, 1992

[51] Int. Cl.$^{5}$ .......... F16H 57/00

[52] U.S. Cl. .......... 74/460; 74/434; 74/573 R

[58] Field of Search .......... 74/460, 434, 573 R; 301/64 SD, 65; 164/122, 359, 485; 29/893, 894, 894.324

[56] References Cited

U.S. PATENT DOCUMENTS

| | | | |
|---|---|---|---|
| 328,736 | 10/1885 | Whitely | 74/434 |
| 790,202 | 5/1905 | Griffith | 164/359 X |
| 2,420,003 | 9/1942 | Miller . | |
| 2,631,897 | 3/1953 | Ewart | 301/65 |
| 3,199,364 | 8/1965 | Dew | 74/460 |
| 3,480,070 | 11/1969 | Beetle et al. | 164/359 X |

FOREIGN PATENT DOCUMENTS

| | | | |
|---|---|---|---|
| 537386 | 4/1959 | Belgium | 29/894.324 |
| 735499 | 11/1932 | France | 301/65 |
| 0158863 | 2/1983 | German Democratic Rep. | 164/359 |

OTHER PUBLICATIONS

2130 Disamatic Molding System, Technical Description, Edition 190184.

*Primary Examiner*—Rodney H. Bonck
*Attorney, Agent, or Firm*—Sixbey, Friedman, Leedom & Ferguson

[57] ABSTRACT

Cast iron gears, such as those used as cam gears on engines and as used for fuel injection gear pumps, which have a hub and a rim that are thick in comparison to the relatively thin web used to interconnect the hub with the rim and a process by which such iron gears can be cast, especially in a vertical orientation. To eliminate porosity problems, single flow channel of substantial thickness is incorporated into the mold cavity which forms a flow rib that runs radially between the hub and rim of the gear being formed. To compensate for both the added weight of the rib that is produced on the web of the resultant gear, as well as to counterbalance the effect caused by the presence of a single rib, at least one opening is formed in the web at each side of the rib.

11 Claims, 3 Drawing Sheets

3 4 1 5 2 2 12 12 W 10 4 R 2

DUCTILE IRON GEAR AND CASTING PROCESS FOR THE PRODUCTION THEREOF

BACKGROUND OF THE INVENTION

1. Field of the Invention

The present invention relates to cast iron gears, such as those used as cam gears on engines and as used for fuel injection gear pumps. Still further, the invention is concerned with a process by which such iron gears can be cast, especially in a vertical orientation.

2. Background of the Invention

Ever since the earliest attempts to produce cast iron and steel wheels and gears, problems have been encountered due to the fact that such products have a hub and a rim that are thick in comparison to the relatively thin web used to interconnect the hub with the rim. That is, this type of product does not cool uniformly, and due to the thin nature of the web, it solidifies before the hub and rim, and this solidification of the web acts as a dam that cuts off a continuing supply of molten metal between the hub and rim, thereby producing areas of porosity due to the inability to fully compensate for shrinkage of the metal as it continues to cool.

To correct for the above-noted problem, the primary focus, from the beginning to now, has been on attempts to modify the normal cooling pattern so as to increase the rate at which the metal in the rim and hub cools while slowing the rate at which the web cools. For example, in U.S. Pat. No. 790,202, thermally conductive chill elements are placed so as to come into contact with the periphery of the rim and the axial ends of the hub, while nonconductive material, such as sand, is in contact with the surfaces of the web. Likewise, in U.S. Pat. No. 2,420,003, a mold is disclosed that is designed to selectively cool the parts of a cast wheel so that the relatively thin web will not prematurely solidify cutting off shrinkage compensating flow between the thick hub and rim of the wheel.

However, the use of chill elements not only makes the mold used more expensive, but it increases the cost of producing the cast product and is not well suited to modern mass production techniques. Likewise, the use of mold with selective cooling arrangements only makes the molds more complicated and expensive.

Furthermore, when a gear or wheel having a thick rim and hub connected by a thin web are produced in a vertical orientation (as is the case in high volume, production lines using "DISAMATIC" type machines; see FIGS. 4 and 5 and 2130 *DISAMATIC MOLDING SYSTEM, TECHNICAL DESCRIPTION*, Edition 190184), problems of shrinkage cavity porosity regions being formed are compounded by the fact that it is not feasible, at least from an economic standpoint, to feed molten metal to the mold at both the hub and rim. Gears produced in a vertical orientation with molten iron fed at the top of the rim have been found to have areas of extensive porosity in the hub. In initial failed attempts by the present applicants to solve this porosity problem in the vertical production of gears, a symmetrical array of three fed ribs were formed on the web and windows were provided between each pair of feed ribs to compensate for the increased weight of the ribs. Such an approach was found to produce areas of porosity in the rim, especially in the vicinity of the lower ribs at the bottom of the gear, without fully correcting the porosity problem in the hub.

SUMMARY OF THE INVENTION

In view of the foregoing, it is an object of the present invention to avoid the above-indicated problems so as to provide a ductile iron gear that can be cast without suffering from porosity defects.

It is a related object to provide a process by which a ductile iron gear can be cast without producing areas of porosity in the gear which can lead to its premature failure, especially when molding the gear in a vertical orientation.

A further object of the present invention is to provide a gear and process for its production in which the preceding objects are achieved without having to use auxiliary cooling elements or techniques.

In keeping with the preceding object, it is another object of the present invention to achieve a gear design that contributes, during its formation, to the prevention of areas of porosity in either the hub or rim of the gear without undesirably increasing its weight of affecting its rotational balance.

In accordance with a preferred embodiment of the present invention, these and other objects are obtained by the incorporation of a single flow channel of substantial thickness into the mold cavity which forms a flow rib that runs radially between the hub and rim of the gear being formed. To compensate for both the added weight of the rib that is produced on the web of the resultant gear, as well as to counterbalance the effect caused by the presence of a single rib, at least one opening is formed in the web at each side of the rib.

These and other objects, features and advantages of the present invention will become apparent from the following detailed description of a preferred embodiment of the invention when viewed in conjunction with the accompanying drawings.

DETAILED DESCRIPTION OF THE PREFERRED EMBODIMENT

Figure 1:
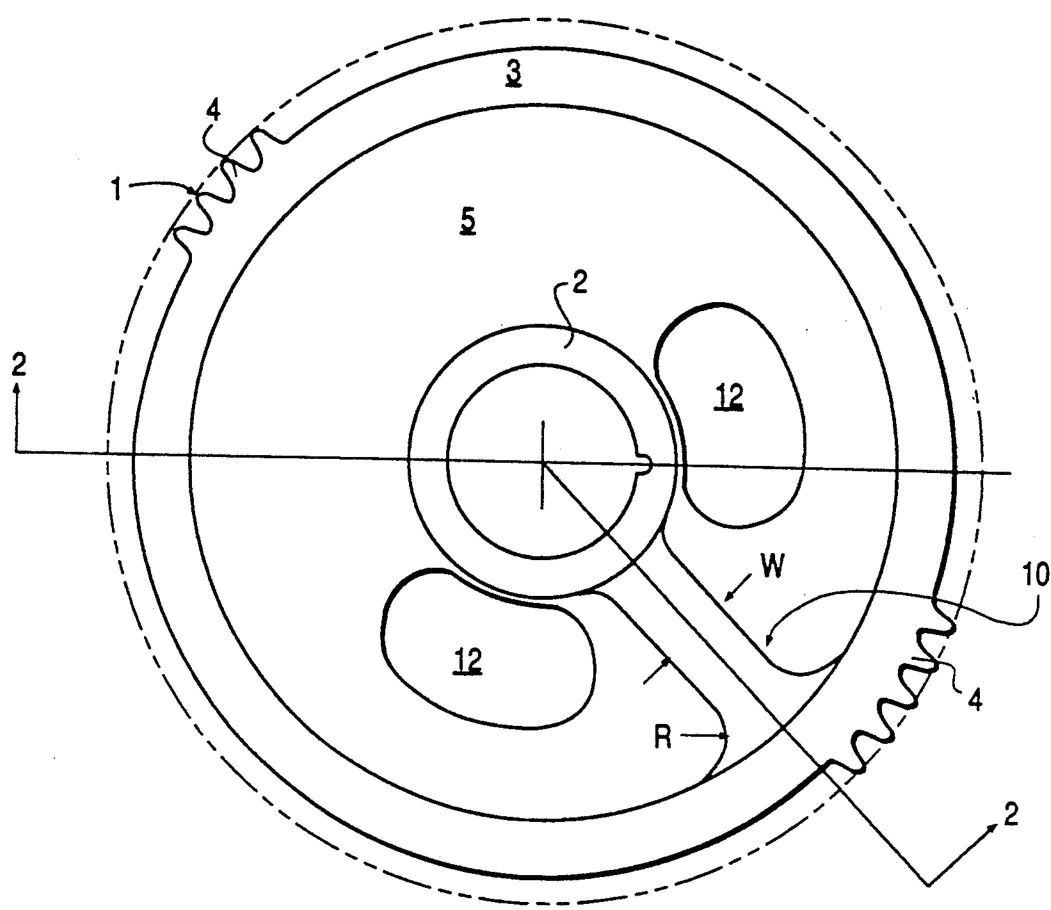
FIG. 1 is a front elevational view of a gear in accordance with a preferred embodiment of the present invention.
Figure 2:
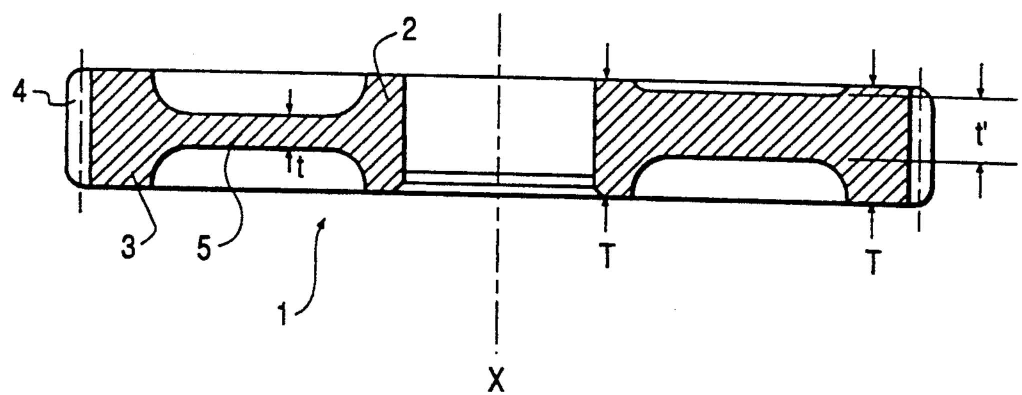
FIG. 2 is a cross-sectional view taken along line 2—2 in FIG. 1.

With reference to FIGS. 1 and 2, a preferred embodiment of a ductile iron gear 1 in accordance with the present invention will be described. Gear 1 has a hub 2 that is interconnected to a rim 3 (on which gear teeth 4 are formed) by a web 5. To this extent, gear 1 is of conventional construction. Furthermore, while the invention is being described relative to a gear as is used, for example, as the cam gear of an engine, the invention encompasses gears for other purposes, such as for a fuel injection gear pump, and equivalent wheels which result from elimination of teeth 4.

Since, in a gear or wheel as described so far, the web 5 has a thickness t(in the direction of the central axis X) that is only about 25% of the thickness T of the hub 2 and the rim 3, the molten iron used to cast the gear 1 will solidify faster in the web 5 than in the hub 2 and rim 3. Solidification of the web prevents iron poured in at the rim flow flowing to the hub so that continued cooling of the hub and rim, after flow between them is cut-off, results in areas of porosity (shrinkage cavities) being formed in the hub 2 as it shrinks away from the solidified web 5. However, this problem is avoided with a gear 1 that is constructed in accordance with the present invention due to the provision of a flow rib 10 which extends radially along the web 5 from the hub 2 to the rim 3. During production of the gear 1, the portion of the mold cavity that forms flow rib 10 is able to serve as a channel through which molten iron continues to flow from the rim 3 to the hub 2 even after the web 5 has solidified. For this purpose, it has been found that the flow rib should have an axial thickness t' that is at least 54% that of the axial thickness T of the rim and hub, and should have a circumferential width W that is at least 62% of axial thickness T. Rib 10 connects with rim 3 and hub 2 via large radius corners to minimize stress concentrations.

To compensate for the added weight of the flow rib 10 as well as for the effect that adding a single rib would have on the rotational balance of the gear, at least one opening 12 is provided in a symmetric arrangement of one opening 12 at each side of the rib 10. The number, size, shape and position of the openings can be freely selected so long as the net effect is to offset the added weight of the rib 10 and its effect on gear balance. Thus, while only a single large opening is shown at each side of flow rib 10 in FIG. 1 and the openings 12 are situated in the same half of the gear as the rib, a greater number of smaller openings could be used instead, and although less desirable, it is even possible to include an opening in the web 5 at the opposite half of the gear so long as its effect is compensated for.

For production of gear 1, any conventional casting technique and apparatus can be used. However, the configuration of the gear 1 of the present invention is particular advantageous with respect to high volume production techniques which involve casting of the gear in a mold which is vertically oriented so that a central axis of the cavity portions forming hub 2 and rim 3 extends horizontally during pouring and solidifying of the molten iron, and the inlet of the mold is positioned to cause the molten iron to enter into the mold cavity at a topmost area of the rim forming portion thereof. One such technique is the "Disamatic Principle," illustrated in FIG. 3, using a casting system as is illustrated in FIG. 4 and is found in the Disamatic Model 2130 molding system.

Figure 3:
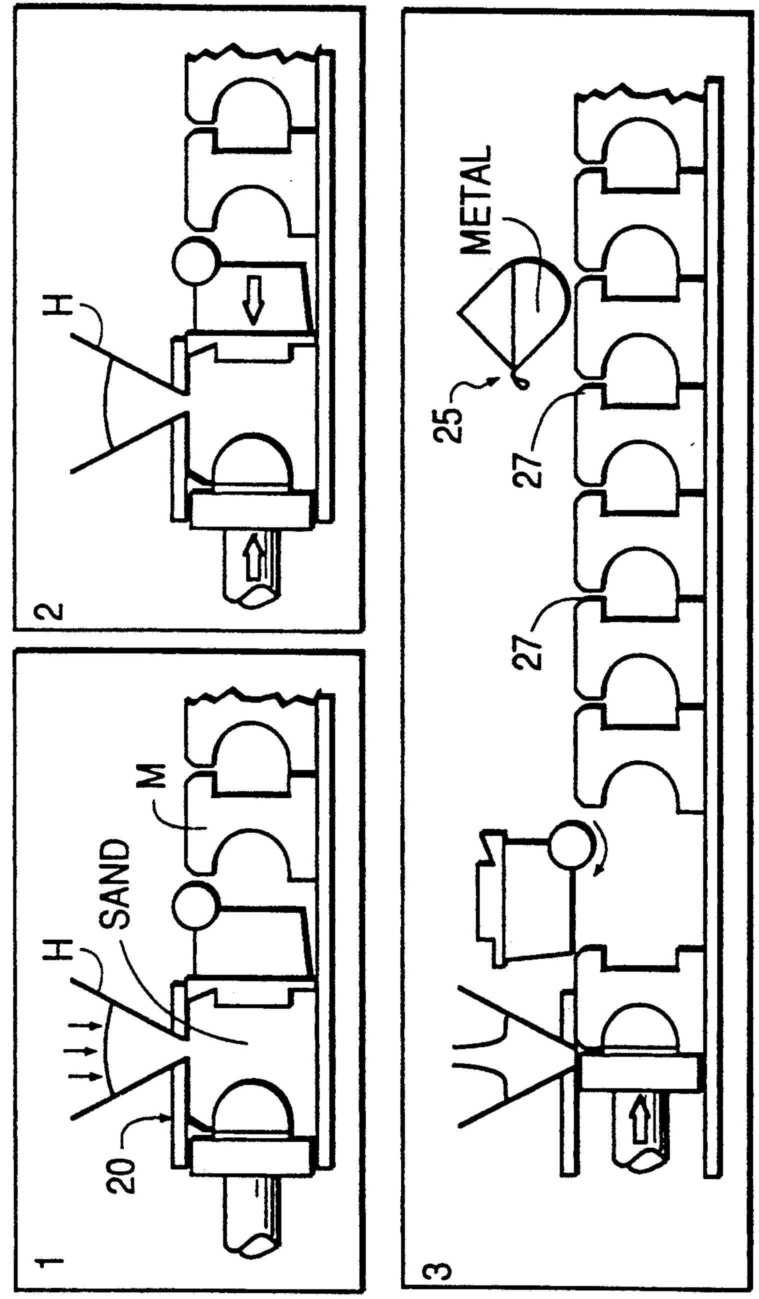
FIG. 3 is a schematic depiction of a prior art molding system for use in performing the process of the present invention.
Figure 4:
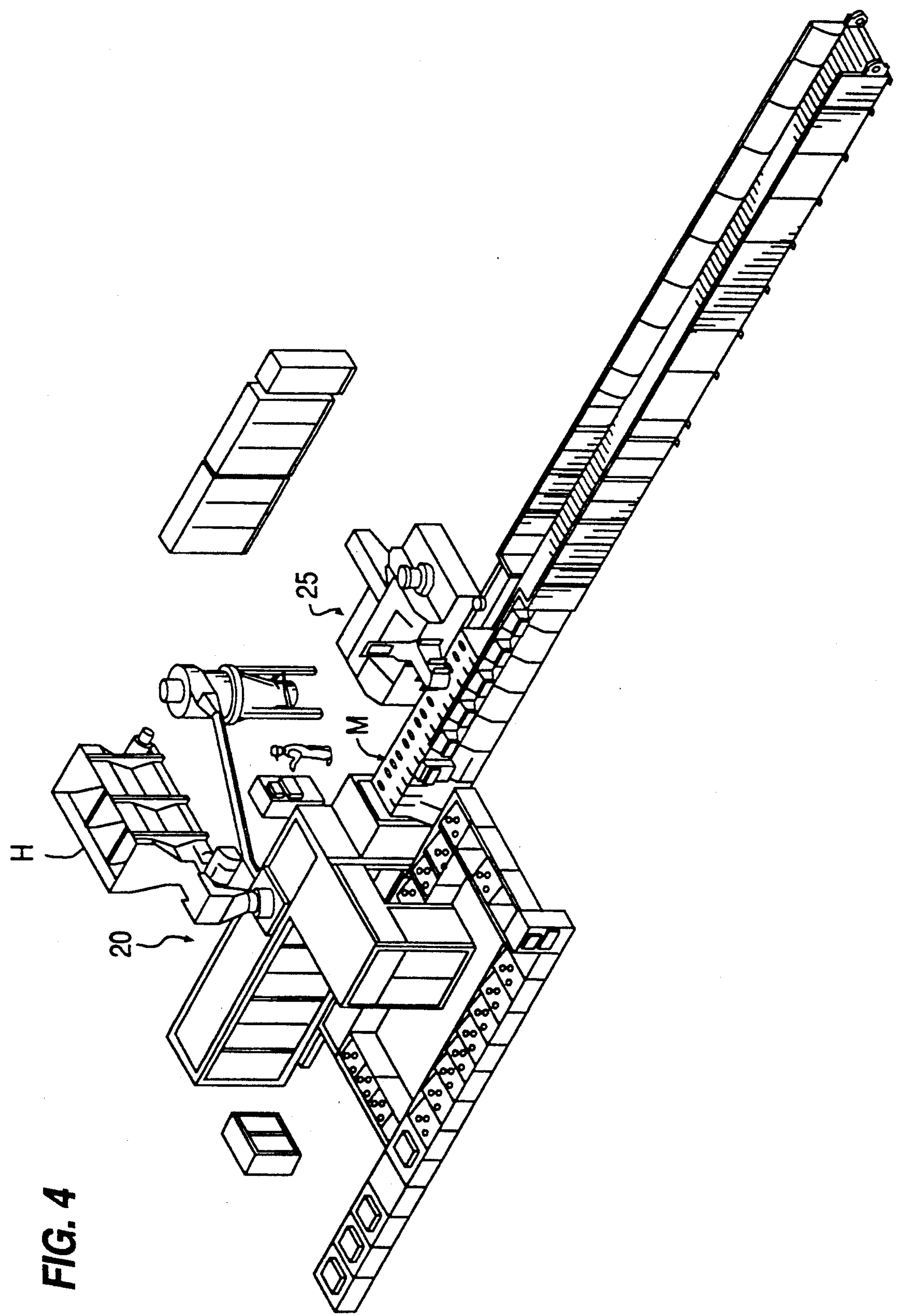
FIG. 4 is a schematic depiction of the principle of operation of the prior art system of FIG. 3.

With reference to FIGS. 3 and 4, sand molds M are produced in a mold forming station 20. In station 20, sand from a hopper H is fed between a pair of press member and compacted to form a mold that is shaped to defined front and back surfaces, respectively, of adjoining mold cavities, as reflected in FIG. 3. In FIG. 3, hemispheric and rectangular cavity defining members are illustrated. However, it should be realized that, in the production of the inventive gear of this application, these members will be shaped to conform with a respective half of gear 1, having portions for forming each of rim 3, hub 2, and interconnecting web 5, as well as for creating openings 12 and defining a flow channel which conforms to rib 10.

Molds M, after being discharged from mold forming station 20, are fed in a continuous line through a pouring station 25 at which molten iron is poured into an inlet 27 to the mold cavity created between each pair of sand molds M. Inlet 27 is located at the top of the mold cavity in alignment with the outer end of the flow channel which conforms with rib 10 of gear 1. The molten iron not only fills the mold cavity but also the inlet which serves as a riser from which metal is able to progressively feed down into the cavity as the metal within the mold cavity shrinks due to cooling thereof. Due to the presence of the rib forming flow channel, even after the metal forming the web 5 has solidified, molten metal can still feed down from the rim area to the hub, thereby avoiding porosity problems from shrinkage cavities being formed in the hub. As noted in the Background portion of this application, surprisingly, the same quality result is not obtainable when a symmetric arrangement of ribs (for example, an inverted Y-shaped rib array) is formed.

INDUSTRIAL APPLICABILITY

The present invention will find a wide range of applicability in the casting of iron gears, wheels and other structures in which a thin web interconnects thicker hub and rim regions, and where high strength and rotational balance are needed. The invention will be particularly useful in the high volume production of products having the characteristic via systems which make it too costly or otherwise impractical to orient the mold horizontally and to feed molten metal to both the rim and hub forming areas of the mold cavity.

We claim:

1. A cast ductile iron gear or wheel of the type having a web interconnecting a relatively thick hub to a relatively thick rim, the improvement for facilitating casting of the gear while substantially maintaining the weight and rotational balance thereof comprising said web being formed with only a single flow rib extending radially from the hub to the rim of the gear and with at least one opening through said web in a symmetrical arrangement on opposite sides of the flow rib.

2. A cast ductile iron gear or wheel according to claim 1, wherein a single said opening is provided at each side of the flow rib.

3. A cast ductile iron gear or wheel according to claim 2, wherein each said opening is confined to the same half of the gear as the flow rib.

4. A cast ductile iron gear or wheel according to claim 1, wherein each said opening is confined to the same half of the gear as the flow rib.

5. A cast ductile iron gear or wheel according to claim 4, wherein the axial thickness of the flow rib is at least fifty-four percent (54%) of the aixal thickness of the rim and hub.

6. A cast ductile iron gear or wheel according to claim 5, wherein the circumferential width of the flow rib is at least sixty-two percent (62%) of the axial thickness of the rim and hub.

7. A cast ductile iron gear or wheel according to claim 1, wherein the axial thickness of the flow rib is at least fifty-four percent (54%) of the axial thickness of the rim and hub.

8. A cast ductile iron gear or wheel according to claim 7, wherein the circumferential width of the flow rib is at least sixty-two percent (62%) of the axial thickness of the rim and hub.

9. A cast ductile iron gear or wheel according to claim 7, wherein a single said opening is provided at each side of the flow rib.

10. A cast ductile iron gear or wheel according to claim 1, wherein said at least one opening at each side of the rib, together are sized, shaped and positioned to act as a means for compensating for the presence of the flow rib on the web from both weight and balance standpoints.

11. A cast ductile iron gear or wheel of the type having a web interconnecting a relatively thick hub to a relatively thick rim, the improvement for facilitating casting of the gear while substantially maintaining the weight and rotational balance thereof comprising said web being formed with only a single flow rib extending radially from the hub to the rim of the gear and with remaining portions of said web being configured in a arrangement that is symmetrical relative to opposite sides of the single flow rib and that offsets the weight and the distribution thereof imposed on the gear or wheel by said single flow rib.

* * * * *